United States Patent [19]

Nakawaki et al.

[11] Patent Number: 4,836,056
[45] Date of Patent: Jun. 6, 1989

[54] CONTROL APPARATUS FOR VEHICLE POWER TRANSMITTING SYSTEM INCLUDING CONTINUOUSLY VARIABLE TRANSMISSION

[75] Inventors: Yasunori Nakawaki, Susono; Akio Numazawa, Nagoya; Takashi Hayashi, Susono, all of Japan

[73] Assignee: Toyota Jidosha Kabushiki Kaisha, Japan

[21] Appl. No.: 126,886

[22] Filed: Nov. 30, 1987

[30] Foreign Application Priority Data

Dec. 11, 1986 [JP] Japan ................ 61-295394

[51] Int. Cl.$^4$ ............................................. B60K 41/4
[52] U.S. Cl. .......................................... 74/866; 74/870
[58] Field of Search ............... 74/866, 870, 877; 364/424.1

[56] References Cited

U.S. PATENT DOCUMENTS

| | | | |
|---|---|---|---|
| 4,543,855 | 10/1985 | Oetting et al. | 74/877 |
| 4,594,916 | 6/1986 | Ito et al. | 74/866 |
| 4,610,183 | 9/1986 | Nobumoto et al. | 74/866 |
| 4,656,587 | 4/1987 | Osanai et al. | 74/866 |
| 4,663,991 | 5/1987 | Nakamura et al. | 74/866 |
| 4,704,683 | 11/1987 | Osanai et al. | 74/866 |
| 4,727,771 | 3/1988 | Niwa et al. | 74/866 |

FOREIGN PATENT DOCUMENTS 0125449 7/1985 Japan ............................ 74/866
136052 6/1986 Japan .

*Primary Examiner*—Dirk Wright
*Assistant Examiner*—Harold F. Macris
*Attorney, Agent, or Firm*—Oliff & Berridge

[57] ABSTRACT

A control apparatus for a vehicle for a continuously variable transmission (CVT) whose speed ratio is continuously variable, the apparatus including a mode selector responsive to a currently required output of an engine, for selecing one of a continuously variable speed mode in which the speed ratio of the CVT is continuously changed, and a stepping shift mode in which the speed ratio is changed in a plurality of steps. The apparatus further includes a first control device operable in the continuously variable speed mode, for continuously changing the speed ratio of the continuously variable transmission so as to operate the engine with minimum fuel consumption, and a second control device operable in the stepping shift mode, for selecting one of a plurality of speed-ratio positions corresponding to the above-indicated plurality of steps, and for maintaining the selected speed-ratio position, based on the detected currently required output of the engine and the detected running speed of the vehicle.

7 Claims, 6 Drawing Sheets

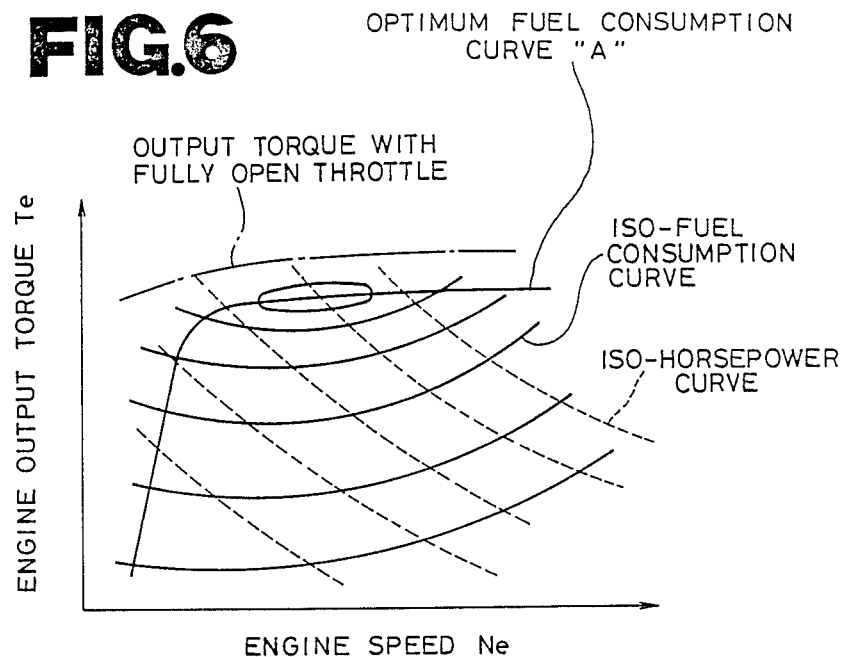
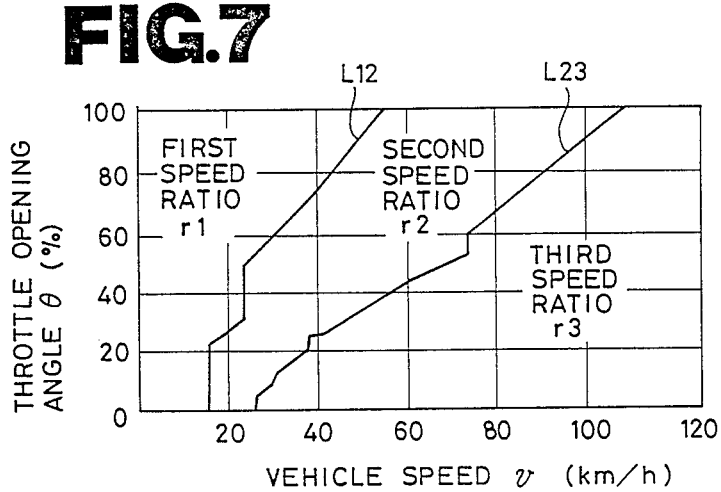

FIG.8 CONVENTIONAL CONTROL
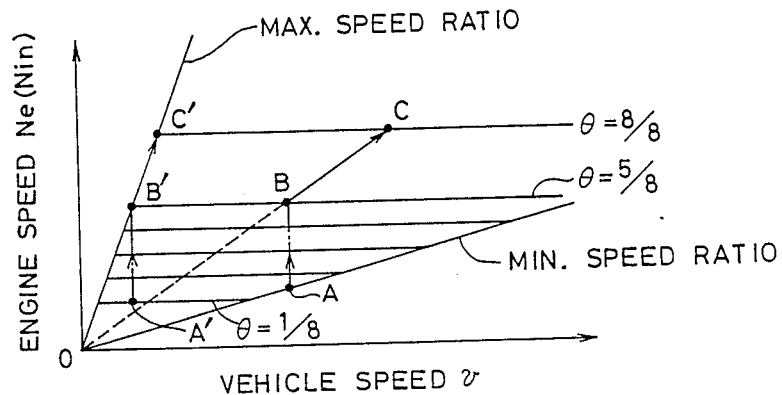
FIG.9
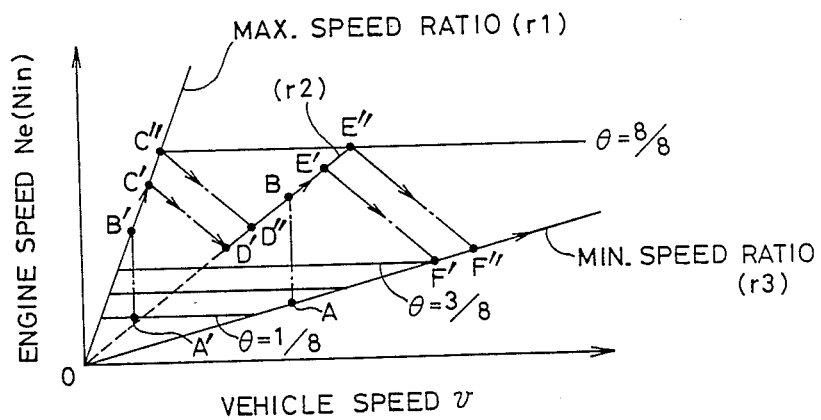

CONTROL APPARATUS FOR VEHICLE POWER TRANSMITTING SYSTEM INCLUDING CONTINUOUSLY VARIABLE TRANSMISSION

BACKGROUND OF THE INVENTION

1. Field of the Invention

The present invention relates generally to a control apparatus for controlling a power transmitting system for an automotive vehicle, including a continuously variable transmission, and more particularly, to a technique for controlling the continuously variable transmission operable in a stepping shift mode wherein the speed ratio is changed in steps based on the currently required output of an engine. In particular, the invention is concerned with a technique for improving the acceleration response of the vehicle to a change in the required output of the engine, and improving the fuel economy of the engine.

2. Discussion of the Prior Art

A control apparatus or method for controlling a continuous variable transmission (hereinafter referred to as "CVT") is known in the art of controlling a power transmitting system of an automotive vehicle. According to one form of such a controller or method, when the currently required output of the engine is smaller than a predetermined upper limit, a target engine speed or a target speed ratio of the CVT is determined so that the actual engine speed is changed only in response to a change in the required output of the engine. When the required engine output is larger than the upper limit, the target engine speed or target CVT speed ratio is determined so that the speed ratio of the transmission is kept at a fixed value. A typical example of such a control apparatus is disclosed in laid-open publication No. 61-136052 of Japanese Patent Application. According to this control apparatus, the CVT maintains the same speed ratio, once an opening angle of a throttle valve of the engine exceeds a predetermined level. This arrangment permits a rapid increase in the vehicle drive force upon rapid or abrupt increase in the throttle opening angle, thereby permitting a relatively high degree of acceleration response, or assuring a powerful acceleration feeling.

However, the control apparatus or method indicated above suffers from a problem due to the use of the same speed ratio of the CVT once the throttle opening angle exceeds the predetermined upper limit. Namely, the engine speed must be raised according to an increase in the vehicle speed, after the speed ratio of the CVT is fixed or after the throttle opening angle reaches the upper limit. This arrangement therefore fails to provide sufficiently high fuel economy of the engine.

SUMMARY OF THE INVENTION

It is therefore an object of the present invention to provide a control apparatus for controlling a power transmitting system for an automotive vehicle, including a continuously variable transmission, which apparatus is capable of improving the acceleration response of the vehicle to a change in the required output of the engine, and improving the fuel economy of the engine.

The above object may be achieved according to the principle of the present invention, which provides a control apparatus for an automotive vehicle, including a continuously variable transmission whose speed ratio is continuously variable, wherein power is transmitted from an engine of the vehicle to drive wheels of the vehicle, the control apparatus comprising: (a) first detector means for detecting a currently required output of the engine; (b) second detector means for detecting a running speed of the vehicle; (c) mode selector means responsive to the detector means, for selecting, based on the detected currently required output of the engine, one of a continuously variable speed mode in which the speed ratio of the continuously variable transmission is continuously changed, and a stepping shift mode in which the speed ratio is changed in a plurality of steps, the continuously variable transmission having a plurality of speed-ratio positions which correspond to the plurality of steps; (d) first control means operable when the continuously variable speed mode is selected, for continuously changing the speed ratio of the continuously variable transmission so as to operate the engine according to an optimum fuel consumption curve; and (e) second control means operable when the stepping shift mode is selected, for selecting one of the plurality of speed-ratio positions and maintaining the selected speed-ratio position, based on the detected currently required output of the engine and the detected running speed of the vehicle.

In the control apparatus of the present invention constructed as described above, either the continuously variable speed mode or the stepping shift mode is selected by the mode selector means, based on the currently required output of the engine, which is typically represented by the opening angle of a throttle valve, or an operating amount of an accelerator pedal. Generally, the continuously variable speed mode is selected while the currently required output of the engine is smaller than a predetermined value, and the stepping shift mode is selected while the required engine output is larger than the predetermined value. In the continuously variable speed mode, the speed ratio of the continuously variable transmission is continuously changed by the first control means so that the engine is run with a minimum fuel consumption, or according to the optimum fuel consumption curve, whereby the fuel economy of the vehicle is improved. In the stepping shift mode, the speed ratio of the transmission is changed in the predetermined steps so that the plurality of speed-ratio positions of the transmission which correspond to the shifting steps are selected, based on the currently required engine output and the current vehicle speed. The selected speed-ratio position of the transmission is maintained as long as the required engine output and vehicle speed satisfy the certain conditions.

Therefore, after the currently required output of the engine exceeds the predetermined value, the continuously variable transmission is controlled so that its speed ratio is changed in steps as the required output of the engine increases from the predetermined value. Thus, the instant control apparatus assures a sufficiently high acceleration response to an increase in the current requirement of the engine output, when the continuously variable transmission is operated in the stepping shift mode. Further, since the transmission has the plurality of speed-ratio positions that provides different speed ratios for different ranges of the vehicle speed, an optimum one of the speed ratios can be selected depending upon the specific running speed of the vehicle. For instance, where first, second and third speed ratios which increase in the order of description are employed in the stepping shift mode, these three different speed ratios are sequentially selected as the vehicle speed and the required engine output are increased. Accordingly, the stepping shift mode of operation can also be performed with a relatively high standard of fuel economy.

According to one feature of the present invention, the engine has a throttle valve, and the first detector means comprises a throttle sensor for detecting a current opening angle of the throttle valve. In this case, the selector means is adapted to select the continuously variable speed mode when the detected opening angle of the throttle valve is equal to or smaller than a predetermined reference value, and select the stepping shift mode when the detected opening angle is larger than the reference value.

According to another feature of the invention, the vehicle has an accelerator pedal, and the first detector means senses an amount of operation of the accelerator pedal to detect the currently required output of the engine. In this case, the selector means is adapted to select the continuously variable speed mode when the detected amount of operation of the accelerator is equal to or smaller than a predetermined reference value, and select the stepping shift mode when the detected amount of operation is larger than the reference value.

According to a further feature of the invention, the control apparatus further comprises third detector means for detecting an actual speed of an input shaft of the continuously variable transmission, and memory means for storing a first relationship among a target speed of the input shaft, the detected currently required output of the engine and the detected running speed of the vehicle. When the continuously variable speed mode is selected, the first control means determines the target speed of the input shaft according to the first relationship, based on the detected currently required output of the engine and the detected running speed of the vehicle, and controls the continuously variable transmission such that the speed ratio is continuously changed so that the detected actual speed of the input shaft coincides with the determined target speed.

According to a still further feature of the invention, the control apparatus further comprises third detector means for detecting an actual speed ratio of the continuously variable transmission, and memory means for storing a first relationship among a target speed ratio of the transmission, the detected currently required output of the engine and the detected running speed of the vehicle. The first control means is operable in the continuously variable speed mode, to determine the target speed ratio of the transmission according to the first relationship, based on the detected currently required output of the engine and the detected running speed of the vehicle, and control the continuously variable transmission such that the speed ratio is continuously changed so that the detected actual speed ratio of the input shaft coincides with the determined target speed ratio.

According to a yet further feature of the invention, the control apparatus further comprises third detector means for detecting an actual speed of an input shaft of the continuously variable transmission, and memory means for storing a second relationship among a target speed of the input shaft, the detected currently required output of the engine and the detected running speed of the vehicle. The second control means is operable in the stepping shift mode, to determine the target speed of the input shaft according to the second relationship, based on the detected currently required output of the engine and the detected running speed of the vehicle, in order to permit the continuously variable transmission to maintain the selected speed-ratio position. The second means controls the continuously variable transmission such that the speed ratio is changed in the plurality of steps so that the actual speed of the input shaft coincides with the determined target speed.

According to yet another feature of the invention, the control apparatus further comprises third detector means for detecting an actual speed ratio of the continuously variable transmission, and memory means for storing a second relationship among a target speed ratio of the transmission, the detected currently required output of the engine and the detected running speed of the vehicle. The second control means is operable in the stepping shift mode, to determine the target speed ratio of the transmission according to the second relationship, based on the detected currently required output of the engine and the detected running speed of the vehicle, in order to permit the continuously variable transmission to maintain the selected speed-ratio position. The second means controls the continuously variable transmission such that the speed ratio is changed in the plurality of steps so that the actual speed ratio of the input shaft coincides with the determined target speed ratio.

BRIEF DESCRIPTION OF THE DRAWINGS

The above and other objects, features and advantages of the present invention will be better understood by reading the following presently preferred embodiments of the invention, when considered in conjunction with the accompanying drawings, in which:

FIG. 6 is a diagram depicting characteristic curves of an engine including an optimum fuel consumption curve;

FIG. 7 is a so-called "shift diagram" for explaining a second relationship also included in the data map of FIG. 4;

FIG. 8 is a diagrammatic view illustrating an operation of a conventional control apparatus for a continuously variable transmission;

FIG. 9 is a diagrammatic view illustrating an operation of the c apparatus of FIG. 1.

DETAILED DESCRIPTION OF THE PREFERRED EMBODIMENTS

The presently preferred embodiments of the present invention will be described in detail, by reference to the accompanying drawings.

Figure 1:
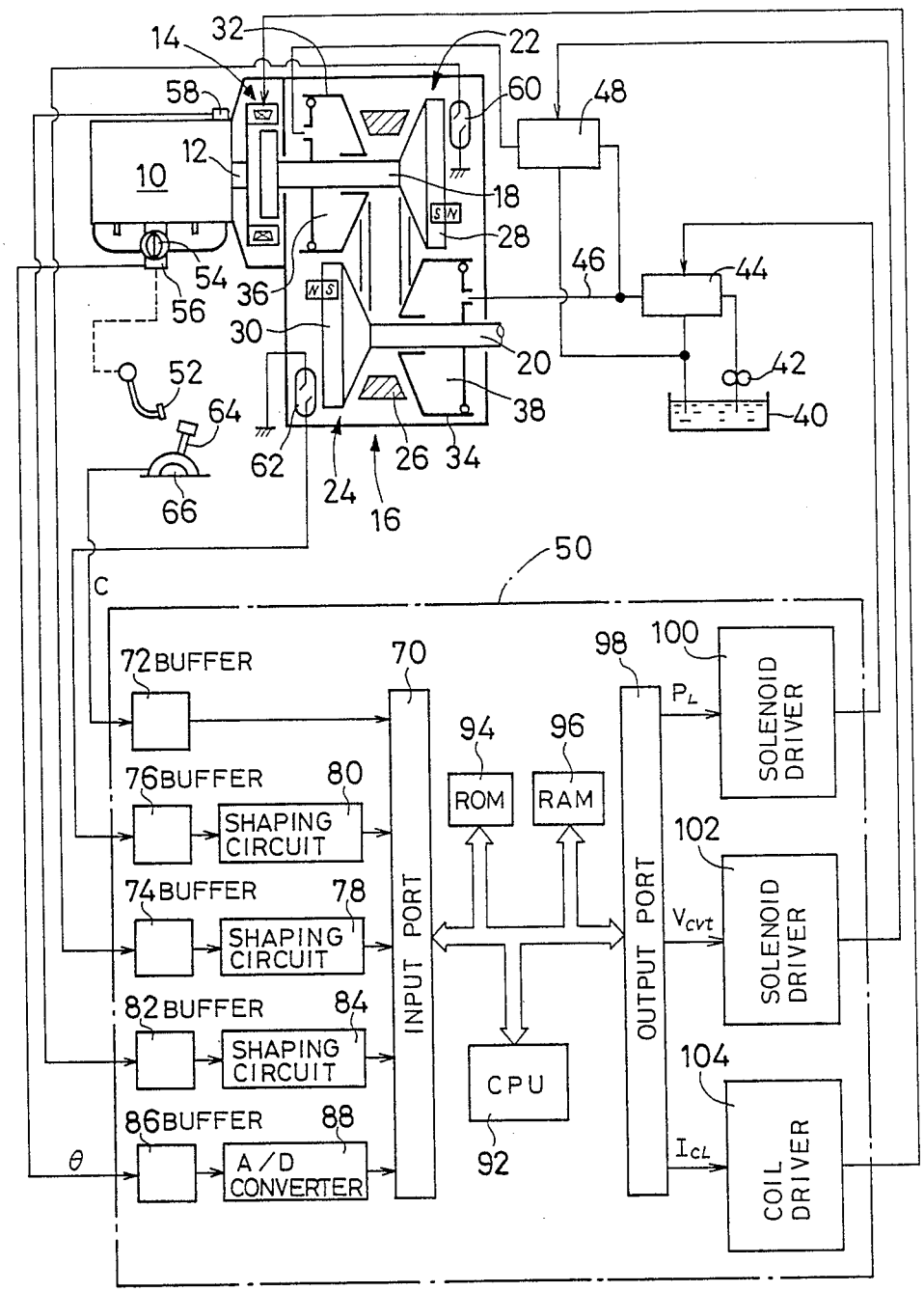
FIG. 1 is a schematic, partially diagrammatic view of a power transmitting system of an automotive vehicle, including a continuously variable transmission, and one embodiment of a control apparatus of the present invention adapted to control the continuously variable transmission.

Referring first to FIG. 1, there is shown a power transmitting system for an automotive vehicle, wherein a crankshaft 12 of an engine 10 is connected via an electromagnetic clutch 14 to an input shaft 18 of a belt-and-pulley type continuously variable transmission 16 (hereinafter referred to as "CVT 16"). An output shaft 20 of the CVT 16 is operatively connected to drive wheels of the vehicle, through a differential gear (not shown) and other components, whereby power is transmitted from the engine 10 to the drive wheels.

The input and output shafts 18, 20 of the CVT 16 are provided with respective input and output pulleys 22, 24 whose effective diameters are variable. These pulleys 22, 24 are connected to each other by a belt 26. Each of the input and output pulleys 22, 24 has an axially stationary rotor 28, 30 fixed to the corresponding input or output shaft 18, 20, and an axially movable rotor 32, 34 which is mounted on the corresponding shaft 18, 20 such that the rotor 32, 34 is movable on the shaft 18, 20 in the axial direction, and is rotated with the shaft 18, 20. The axially stationary and movable rotors 28, 32 on the input shaft 18, and the axial stationary and movable rotors 30, 34 on the output shaft 20, define therebetween V-shaped grooves whose widths are changed when the axially movable rotors 32, 34 are moved on the corresponding shafts 18, 20, by respective hydraulic cylinders 36, 38. Namely, the hydraulic cylinders 36, 38 are activated to vary the effective diameters of the input and output pulleys 22, 24.

The hydraulic cylinders 36, 38 are fed with a pressurized fluid generated by a pump 42. Described in greater detail, a working fluid in a hydraulic reservoir 40 is pumped up by the pump 42, to deliver the pressurized fluid to a pressure regulating valve 44. This valve 44 is controlled by a controller 50 (which will be described), to establish a line pressure in a hydraulic line 46, which is connected to the hydraulic cylinder 38 for the output pulley 24 and to a flow control valve 48. Generally, the line pressure is determined according to a formula discussed later, based on an output torque Te of the engine 10, a speed ratio r of the CVT 16 ($r=Nin/Nout$, where Nin and Nout represent rotating speeds of the input and output shafts 18, 20, respectively), and other parameters. This line presssure is held at a minimum level required to establish a suitable tension of the belt 26 sufficient to avoid its slip on the pulleys 22, 24.

The flow control valve 48, which is also controlled by the controller 50, is adapted to also function as a directional control valve operable to supply the pressurized fluid of the line 46 to the input-side hydraulic cylinder 36 for reducing the speed ratio r of the CVT 16, or to discharge the fluid from the hydraulic cylinder 36 for increasing the speed ratio r. Certainly, the rate of flow of the fluid to and from the cylinder 36 is controlled by the flow control valve 48.

In an intake manifold of the engine 10, there are disposed a throttle valve 54 activated by an accelerator pedal 52, and a throttle sensor 56 for detecting an opening angle $\theta$ of the throttle valve 54. The engine 10 is provided with an engine-speed sensor 58 for detecting its running speed Ne, based on a signal from an ignition circuit, or other signal indicative of the speed Ne. Adjacent to the axially stationary rotors 28, 30 of the CVT 16, there are disposed first and second speed sensors 60, 62, respectively, which are adapted to detect the rotating speeds Nin and Nout of the input and output shafts 18, 20, respectively. The vehicle has a shift lever 64 near the driver's seat. A shift sensor 66 is provided to sense the currently selected position of the shift lever 64.

The controller 50 indicated above includes: an input port 70; a buffer 72 through which a signal from the shift sensor 66 is fed to the input port 70; buffers 74 and 76, and shaping circuits 78 and 80, through which signals from the first and second speed sensors 60, 62 are fed to the input port 70; a buffer 82 and a shaping circuit 84, through which a signal from the engine-speed sensor 58 is fed to the input port 70; and a buffer 86, and an A/D converter 88, through which a signal from the throttle sensor 56 is fed to the input port 70. The controller 50, which is a so-called microcomputer, further includes a CPU 92 (central processing unit), a ROM 94 (read-only memory), a RAM 96 (random-access memory) and an output port 98. The microcomputer is adapted to process the various input signals applied to the input port 70, according to control programs stored in the ROM 94, while utilizing a temporary storage function of the RAM 96, so that controlled drive signals are fed from the output port 98 to the solenoid driver circuits 100, 102 to control the pressure regulating and flow control valves 44, 48, respectively, and to the coil driver circuit 104 to control the electromagnetic clutch 14. In the present embodiment, the controller 50 functions as first control means for controlling the CVT 16 in a "continuously variable speed" mode such that the speed ratio r is varied continuously, so as to assure a minimum fuel consumption by the engine 10. The controller 50 also functions as second control means for controlling the CVT 16 in a "stepping shift" mode such that the CVT 16 is held in one of a plurality of speed-ratio positions, so as to assure optimum drivability of the vehicle. The "continuously variable speed" mode is interpreted to mean a control mode in which the speed ratio r of the CVT 16 is changed in a continuously or stepless manner, so that the actual speed Nin of the input shaft 18 (equal to the engine speed Ne) coincides with a desired or target speed that is determined to assure maximum fuel economy of the engine 10. On the other hand, the "stepping shift" mode means a control mode in which one of a plurality of predetermined speed ratios r of the CVT 16 is automatically selected, as in a conventional automatic transmission having a plurality of gear positions, according to a predetermined shift diagram, based on the actual opening angle $\theta$ of the throttle valve 54 and the current running speed v of the vehicle. The selected speed ratio r i maintained as long as the throttle opening angle and the vehicle speed satisfy a predetermined relationship defined by a shift diagram, as described later in detail.

Figure 2:
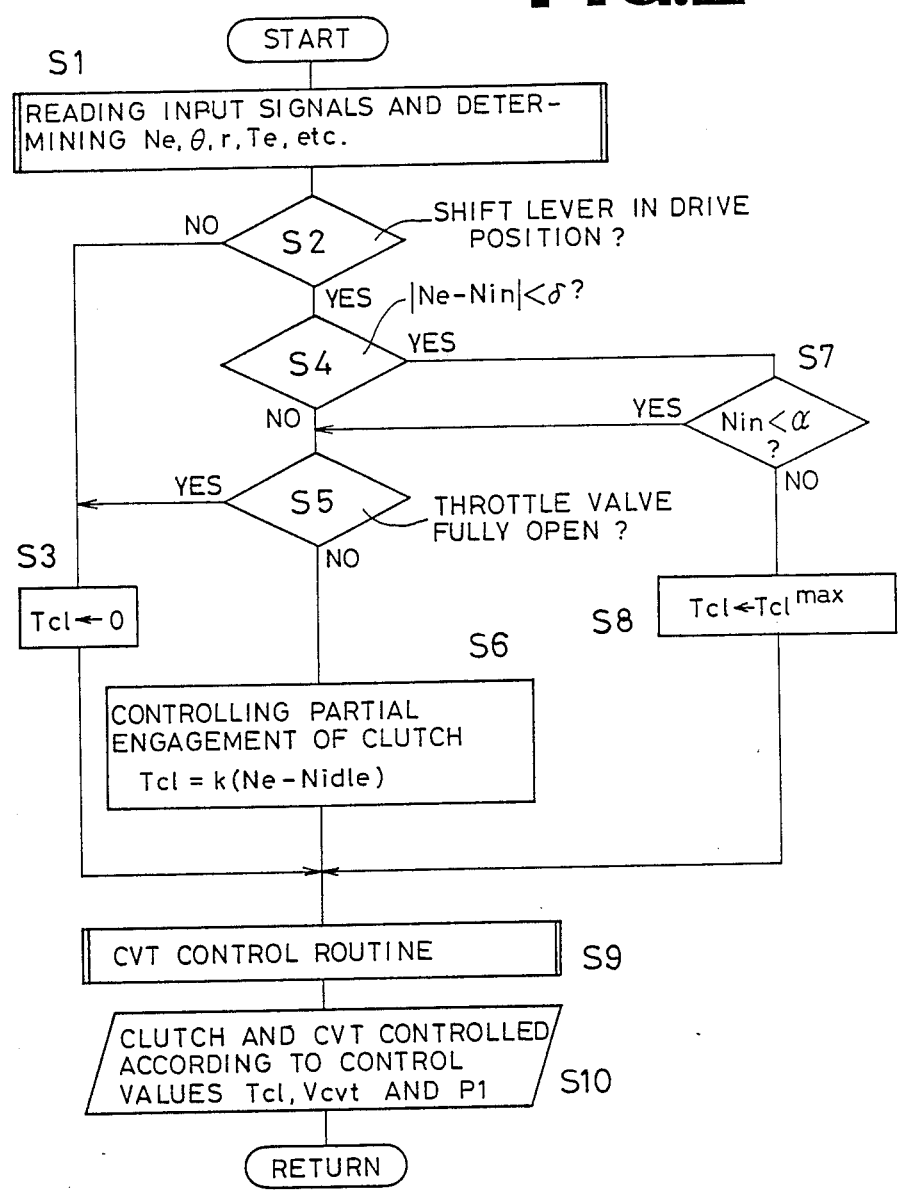
FIG. 2 is a flow chart illustrating an operation of the control a for the transmission of FIG. 1.

The operation of the controller 50 associated with the present embodiment will be explained, referring to the flow chart of FIG. 2.

In step S1, the input signals applied to the input port 70 are stored in the RAM 96. Based on the stored input signals, the CPU 92 determines the rotating speed Nin of the input shaft 18, the rotating speed Nout of the output shaft 20, the speed Ne of the engine 10, the running speed v of the vehicle, the speed ratio r of the CVT 16, the opening angle $\theta$ of the throttle valve 54, an output torque Te of the engine 10, and a speed reduction ratio e ($e=1/r$). The vehicle speed v is determined based on the speed Nout of the output shaft 20 of the CVT 16. Thus, the second speed sensor 62 serves as detector means for detecting the vehicle speed v. In the next step S2, the CPU 92 determines whether the shift lever 64 is placed in any one of drive positions (positions other than NEUTRAL and PARKING positions). If a negative decision is obtained in step S2, this means that the vehicle is not being driven, and therefore step S2 is followed by step S3 to zero a control value Tc1 to be applied to the electromagnetic clutch 14. If an affirmative decision is made in step S2, this means that the vehicle is in a running state, for example, running in a foward direction. In this case, step S2 is followed by step S4 to determine whether an absolute value |Ne−Nin| (difference between the speed of the engine 10 and the input shaft speed of the CVT 16) is smaller than a predetermined value $\delta$. This step is performed to check if the electromagnetic clutch 14 is engaged or not. For example, the predetermined value $\delta$ is set at about 50 rpm.

When the electromagnetic clutch 14 is not engaged, a negative decision is obtained in step S4, and the CPU 92 goes to step S5 to determine whether the throttle valve 54 is fully closed. If the CPU 92 determines that the throttle valve 54 is fully closed, this means that the accelerator pedal 52 is not depressed at all. In this case, step S5 is followed by step S3 to maintain the disengaged condition of the electromagnetic clutch 14. If the determination in step S5 indicates that the throttle valve 54 is not fully closed, step S5 is followed by step S6 to determine the control value Tc1 to be applied to the clutch 14, according to the following formula (1), in order to determine the amount of partial engagement of the clutch 14, that is, to determine an amount of torque that is transmitted from the clutch 14 to the input shaft 18 at the time of starting of the vehicle:

$$Tc1 = kc1 \cdot (Ne - Nid1) \quad (1)$$

where,
KC1: constant
Nid1: idling speed of the engine 10

It follows from the above formula (1) that the torque transmitted from the electromagnetic clutch 14 (hereinafter referred to as "clutch transmission torque") increases with an increase in the difference between the actual engine speed Ne and the predetermined engine idling speed Nid1, as in the case of a centrifugal clutch, so that the clutch 14 may be smoothly engaged.

If the electromagnetic clutch 14 is engaged, an affirmative decision is obtained in step S4, step S7 is implemented to determine whether the rotating speed Nin of the input shaft 18 is lower than a predetermined value $\alpha$. This step S7 is provided to check if the engaging action of the clutch 14 is completed or not. The value $\alpha$ is set at 1000 rpm, for example. If the decision in step S7 is affirmative, this means that the engaging action of the clutch 14 is not completed, and the CPU 92 goes to step S5 and the subsequent steps described above. If the decision in step S7 is negative, this means that the engaging action of the clutch 14 is completed, and consequently step S7 is followed by step S8 in which the control value Tcl to be applied to the clutch 14 is set to a maximum value $Tcl^{max}$.

After the control value Tcl has been determined in the series of operation steps indicated above, the CPU 92 executes a CVT control routine in step S9 in which the CPU 92 determines a control value Vcvt to be applied to the flow control valve 48 (to control the speed ratio r of the CVT 16), and a control value P1 to be applied to the pressure regulating valve 44 (to control the line pressure of the line 46). In the next step S10, the determined control values Tcl, Vcvt and P1 are applied to the clutch 14, flow control valve 48 and pressure regulating valve 44, respectively. An example of the CVT control routine is shown in FIG. 3.

Figure 3:
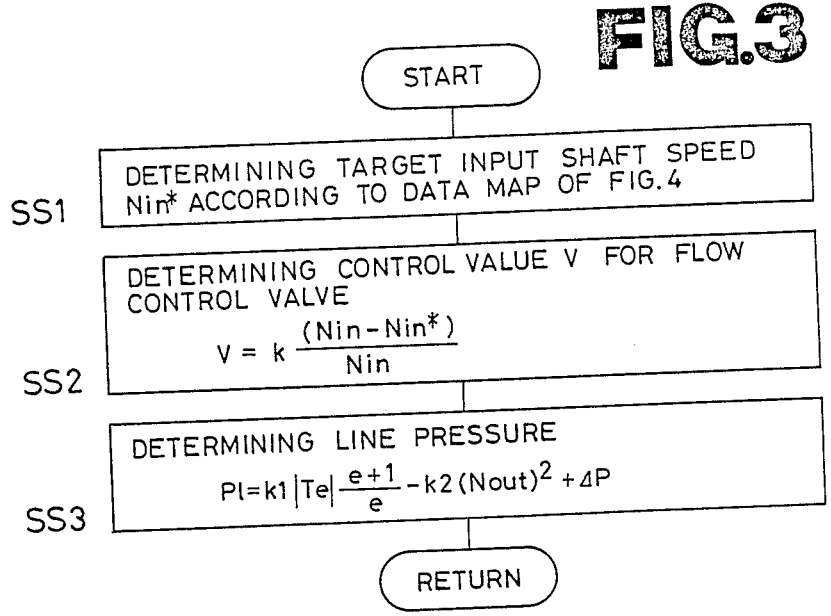
FIG. 3 is a flow chart illustrating a CVT control routine executed during the operation of the control apparatus of FIG. 2.
Figure 4:
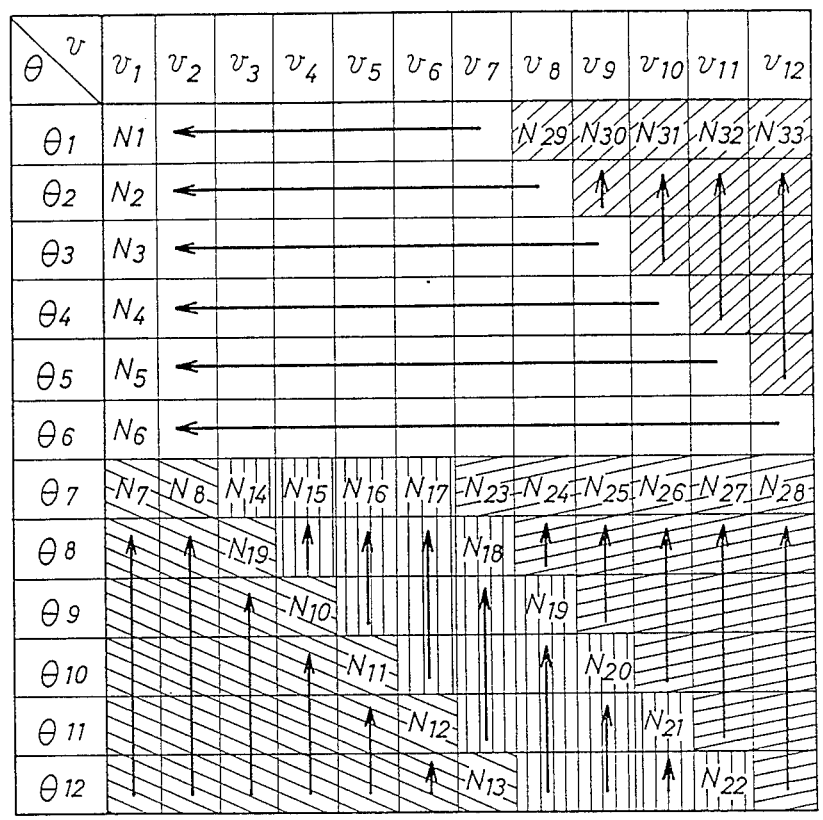
FIG. 4 is a view showing a data map used in the CVT control routine of FIG. 3.

In step SS1 of the CVT control routine of FIG. 3, the CPU 92 determines a target or desired speed Nin* of the input shaft 18 of the CVT 16, according to a control map stored in memory means in the form of the ROM 94, based on the actual or current opening angle $\theta$ of the throttle valve 54, or based on the current throttle opening angle $\theta$ and the current running speed v of the vehicle. An example of the stored control map indicated above is illustrated in FIG. 4. According to this control map wherein throttle opening angles $\theta 1$ through $\theta 12$ and vehicle speeds v1 through v12 increase in the order of description, there are two different basic relationships, i.e., first relationship shown in the upper half of the map (corresponding to $\theta 1$ through $\theta 6$), and second relationship shown in the lower half of the map (corresponding to $\theta 7$ through $\theta 12$).

Figure 5:
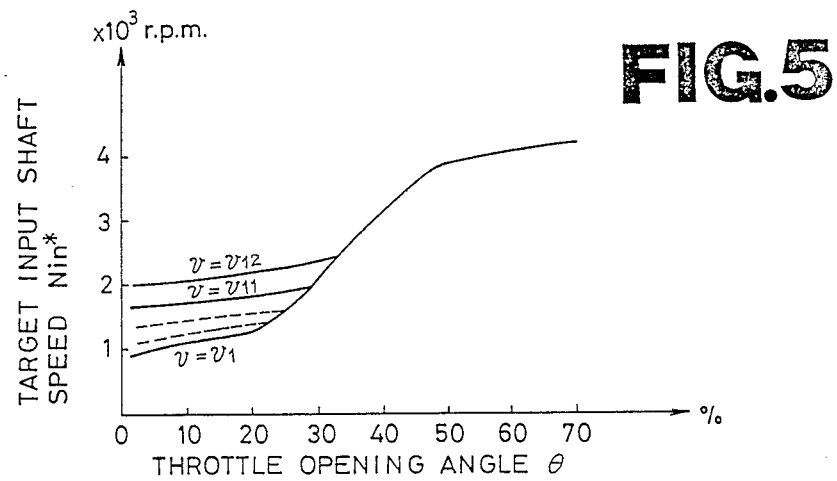
FIG. 5 is a graphical representation for explaining a first relationship included in the data map of FIG. 4.

In the first relationship, the target input shaft speed Nin* is determined substantially as a function of the throttle opening angle $\theta$, and precisely as a function of the throttle opening angle $\theta$ and the vehicle speed v, as shown in FIG. 5. The first relationship is determined so as to operate the engine 10 principally, according to an optimum fuel consumption curve A as indicated in FIG. 6. The data representative of this curve A is stored in the ROM 94. Usually, the target input shaft speed Nin* is obtained by means of interpolating calculation based on adjacent points of the data map. The optimum fuel consumption curve A is primarily based on a minimum fuel consumption curve, but some adjustments are made so as to reflect desired drivability of the vehicle. However, the minimum fuel consumption curve may be used as the optimum fuel consumption curve.

The second relationship is prepared so as to determine the target input shaft speed Nin* so that one of first, second and third speed ratios r1, r2 and r3 (corresponding to three gear positions of a conventional automatic transmission) is selected according to a shift diagram as shown in FIG. 7. This shift diagram is also stored in the ROM 94. Described in greater detail, the diagram has lines L12 and L23 which define three throttle opening vs. vehicle speed conditions in which the first, second and third speed ratios r1, r2 and r3 are established in the CVT 16. When the current throttle opening angle $\theta$ and vehicle speed v lie on the line L12 or L23, the CPU 92 determines to shift the CVT 16 between two positions corresponding to the first and second speed ratios r1, r2, or between two positions corresponding to the second and third speed ratios r2, r3. Once the speed ratio r1, r2 or r3 is selected, the CPU 92 determines the target input shaft speed Nin* according to the following formulas (2), (3) and (4), respectively, and stores the determined target input shaft speed Nin* in the RAM 96, in relation to the vehicle speed v. The target speeds N7 through N13 indicated in FIG. 4 are obtained from the formula (2) and are used to maintain the first speed ratio r1. Similarly, the target speeds N14 through N22, and N23 through N28 are obtained from the formulas (3) and (4) and are used to maintain the second and third speed ratios r2 and r3, respectively.

$$Nin^* = \frac{r1 \cdot rx}{6 \times 10^{-2} \times 2\pi R} \quad (2)$$

-continued $$Nin^* = \frac{r2 \cdot rg}{6 \times 10^{-2} \times 2\pi R} \quad (3)$$

$$Nin^* = \frac{r3 \cdot rg}{6 \times 10^{-2} \times 2\pi R} \quad (4)$$

where,
rg: speed ratio of other speed reduction device such as a final reduction gear
R: effective radius of vehicle wheels during running of the vehicle Thus, the second relationship used in the "stepping shift" mode consists of the relationship defined by the shift diagram of FIG. 7 used to select one of the first, second and third speed ratios r1, r2 and r3 of the CVT 16, and the relationships defined by the formulas (2), (3) and (4) used to determine the target speed Nin* of the input shaft 18 of the CVT 16 that establishes the selected speed ratio r1, r2 or r3. In the present embodiment, a portion of the controller 50 assigned to execute the step SS1 of FIG. 3 provides the first control means for controlling the CVT 16 so as to run the engine 10 according to the optimum fuel consumption curve A when the opening angle of the throttle valve 54 is $\theta$6 or smaller, and the second control means for controlling the CVT 16 so as to place the CVT 16 in one of the three speed-ratio positions, for comparatively higher drivability of the vehicle, when the throttle opening is $\theta$7 or larger. The opening angles $\theta$6 and $\theta$7 are thus used as references values. Further, the controller 50 executing the step SS1 also functions as selector means for selecting the "continuously variable speed" mode or the "stepping shift" mode, depending upon the currently detected throttle opening angle $\theta$. More specifically stated, the "continuously variable speed" mode is selected when the detected throttle opening angle $\theta$ is equal to $\theta$6 or smaller, while the "stepping shift" mode is selected when the throttle opening angle is equal to $\theta$7 or larger. The values of the first, second and third speed ratios r1, r2 and r3 used in the present embodiment are similar to those employed in an ordinary automatic transmission having three forward drive gear positions.

After the target input shaft speed Nin* has been determined in the manner described above, step SS1 is followed by step SS2 in which the control value Vcvt to be applied to the flow control valve 48 is determined according to the following formula (5), based on the determined target input shaft speed Nin* and the detected current input shaft speed Nin:

$$Vcvt = ko \cdot \frac{(Nin - Nin^*)}{Nin} \quad (5)$$

where, ko: constant

As is understood from the above formula (5), the control value Vcvt is determined so as to zero a difference between the target and actually detected input shaft speeds Nin* and Nin. In other words, the control value Vcvt is determined so that the actual input shaft speed Nin coincides with the determined target speed Nin*.

In the following step SS3 of the CVT control routine of FIG. 3, the control value P1 to be applied to the pressure regulating valve 44 is determined according to the following formula (6), based on the output torque Te of the engine 10, the speed ratio r of the CVT 16, the speed Nout of the output shaft 20, and other parameters suitably selected:

$$P1 = k1 |Te|(e+1)/e - k2 \cdot Nout^2 + \Delta P \quad (6)$$

where
e = 1/r
k1: constant
k2: constant

The above formula (6) is prepared to determine the control value P1 so that the pressure of the hydraulic line 46 is regulated to maintain the tension of the belt 26 (force of the belt 26 acting on the pulley 24) at a required minimum. In the formula (6), the second term "e" of the right member is for compensating for a centrifugal hydraulic force of the hydraulic cylinder 38, and the third term "$\Delta P$" is added as a margin.

According to the present control apparatus described above, while the currently detected value $\theta$ of the throttle opening angle is equal to $\theta$6 or smaller, the target speed Nin* of the input shaft 18 of the CVT 16 is determined according to the first relationship (indicated in the upper half of FIG. 4), based on the detected throttle opening angle $\theta$ and the currently detected vehicle speed v, so that the engine 10 may be operated with the optimum fuel consumption defined by the curve A in FIG. 6. The speed ratio r of the CVT 16 is controlled so that the currently detected actual speed Nin of the input shaft 18 coincides with the target speed Nin*. In summary, when the throttle opening angle is equal to $\theta$6 or smaller, the controller 50 commands the CVT 16 to operate in the "continuously variable speed" mode, for minimum fuel consumption by the engine 10, while utilizing the high fuel economy characteristic of the belt-and-pulley type CVT 16.

When the throttle opening angle $\theta$ is equal to the predetermined value $\theta$7 or larger, the CVT 16 is placed in one of the three speed-ratio positions corresponding to the predetermined first, second and third speed ratios r1, r2 and r3, which are selected according to the shift diagram of FIG. 7. To maintain the selected speed ratio r, the target input shaft speed Nin* is determined according to the second relationship (indicated in the lower half of FIG. 4), based on the detected throttle opening angle $\theta$ and vehicle speed v. In this case, too, the actual speed Nin of the input shaft 18 is controlled so as to coincide with the determined target speed Nin*. In summary, when the currently detected throttle opening angle $\theta$ is equal to $\theta$7 or larger, the "stepping shift" mode is automatically selected. In this mode, one of the three fixed speed ratios r1, r2 and r3 as provided in an ordinary conventional automatic transmission is selected depending upon the detected throttle opening angle $\theta$ and vehicle speed v. This mode is suitable to provide a higher drivability feeling at a relatively high vehicle speed, because an output torque of the engine 10 obtained by the depression of the accelerator pedal 52 is substantially consumed for accelerating the vehicle.

In the "stepping shift" mode, the target input shaft speed Nin* of the CVT 16 is determined so that the first, second and third speed ratios r1, r2 and r3 are selectively established depending upon the detected throttle valve opening angle $\theta$ and vehicle speed v. Accordingly, the vehicle is run with the CVT 16 placed in the most suitable one of the three speed-ratio positions for the specific vehicle running speed v. Thus, the "stepping shift" mode also assures high fuel economy. Further, the present mode assures higher drivability of the vehicle, than a conventional control mode in which the speed ratio is fixed once the throttle opening angle exceeds a certain limit. In the present "stepping shift" mode, the CVT 16 is sequentially shifted so as to change the speed ratio r in three steps r1, r2, r3, in response to gradual increases in the throttle opening angle (i.e., currently required output of the engine 10) and the vehicle speed.

The conventional control mode indicated above will be described in more detail, referring to the diagram of FIG. 8, which shows shifting operations of a CVT controlled by a conventional control apparatus, wherein the CVT has three speed-ratio positions. Assuming that the throttle opening is increased from ⅛ position to the fully open position 8/8, the vehicle condition is changed from point A to point B, and from point B to point C, if the throttle valve operation is initiated when the vehicle condition is at point A. Points A, B and C lie on the different speed-ratio lines. If the throttle valve operation is initiated while the vehicle condition is at point A', the vehicle condition is changed from point A' to point B', and from point B' to point C'. As shown in FIG. 8, the CVT maintains the same speed ratio after the throttle opening $\theta$ exceeds the ⅜ position. That is, once the ⅜ position is reached, the CVT does not perform a stepping shifting operation (as effected in an ordinary automatic transmission), in response to increases in the vehicle speed and the throttle opening angle. Therefore, further acceleration of the vehicle requires the engine speed to be raised, and consequently results in reduced fuel economy.

To the contrary, the controller 50 of the present invention is adapted to control the CVT 16 such that the speed ratio is automatically changed in three steps r1, r2, r3 as the vehicle speed and throttle opening angle are increased, once the throttle opening exceeds the predetermined level, for example, the ⅜ position, as indicated in FIG. 9. Assuming the throttle opening is changed from the ⅛ position to the ⅜ position, the vehicle condition is changed from point A' to F' via points B', C', D' and E', if the throttle valve operation is initiated at point A'. If the throttle valve operation is initiated at point A' to change the throttle opening from the ⅛ position to the fully open 8/8 position, the vehicle condition is changed from point A' to F" via points B', C", D", E" and F". If the throttle valve operation is initiated at point A to change the throttle opening from the ⅛ position to the 8/8 position, the vehicle condition is changed from point A to point F'" via point B, E" and F'". As is apparent from the diagram of FIG. 9, the point C' and C" indicate maximum speeds of the engine 10 while the first speed ratio r1 (maximum speed ratio) is selected. Further, the points E' and E" indicate maximum speeds of the engine 10 while the second speed ratio r2 (intermediate speed ratio) is selected. In the "stepping shift" mode according to the present embodiment, the speed ratio r of the CVT 16 is changed from the first speed ratio r1 to the second speed ratio r2, or from the second speed ratio r2 to the third speed ratio r3, when the engine speed Ne reaches the maximum speed while the first or second speed ratio r1, r2 is selected. Accordingly, the instant "stepping shift" mode of operation assures improved fuel economy of the vehicle.

As is seen in FIG. 9, the engine speed Ne is lowered relatively slowly from point C' to D' and from point E' to F', from point C" to D" and from point E" to F", because the target input shaft speed Nin* determined according to the data map of FIG. 4 is varied from the current level to a newly established level, such that the intermediate levels between these current and new levels are successively determined by linear interpolation. As a result, the actual engine speed Ne which follows the determined target speed Nin* is lowered at a relatively low rate. If the shifting shock of the CVT 16 does not matter, however, the target speed Nin* may be changed at a considerably high rate, so that the engine speed Ne is lowered relatively rapidly.

While the present invention has been described in its preferred embodiment with a certain degree of particularity, it is to be understood that the invention may be otherwise embodied.

For example, although the illustrated embodiment is adapted to control the flow control valve 48 such that the actual input shaft speed Nin coincides with the determined target speed Nin*, it is possible to control the power transmitting system such that the actual engine speed Ne coincides with the target speed Nin* of the input shaft 18 of the CVT 16.

Since the speed ratio r and the input shaft speed Nin maintain a predetermined relation with each other, controlling the speed ratio r so that the actual engine speed Ne coincides with the target input shaft speed Nin*, is substantially the same as controlling the speed ratio r such that the speed ratio r coincides with a target speed ratio r* which is determined so that the actual engine speed Ne coincides with the target input shaft speed Nin*. In this case, one of three predetermined target speed ratio values r* is selected corresponding to one of the three speed ratios r1, r2, r3 which is selected according to the shift diagram of FIG. 7, while the "stepping shift" mode is selected.

While the throttle opening angle $\theta$ of the throttle valve 54 is used as a variable indicative of the currently required output of the engine 10, this variable may be replaced by an operating amount of the accelerator pedal 52, or other variables such as an amount of fuel supply to the engine, which are changed in relation to the operating amount of the pedal 52.

Figure 10:
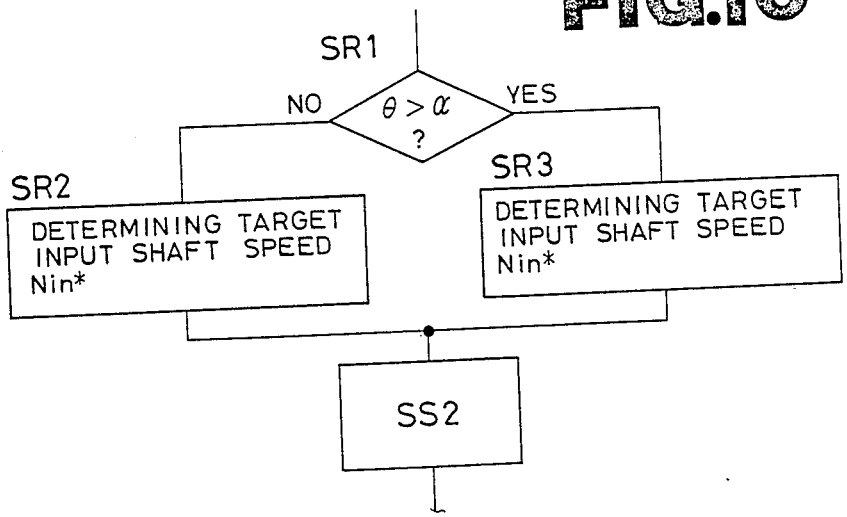
FIG. 10 is a flow chart depicting a part of an operation according to a modified embodiment of the invention.

Further, the step SS1 of the CVT control routine shown in FIG. 3 may be replaced by a series of steps indicated in FIG. 10. In this case, step SR1 is initially executed to determine whether the throttle opening angle $\theta$ is larger than a predetermined reference value $\alpha$. This value $\alpha$ is equivalent to the reference value $\theta 6$ or $\theta 7$ of the throttle opening angle, used in the preceding embodiment. If a negative decision is obtained in step SR1, the "continuously variable speed" mode is selected, and step SR2 is implemented to determine the target input shaft speed Nin*, according to the first relationship described above, and based on the detected throttle opening angle $\theta$ and the detected vehicle speed v. If an affirmative decision is obtained in step SR1, the "stepping shift" mode is selected, and step SR3 is implemented to determine the target input shaft speed Nin* according to the second relationship described above, and based on the detected throttle opening angle $\theta$ and vehicle speed v. Step SR2 or SR3 is followed by step SS2 and subsequent steps of the CVT routine of FIG. 3. In this modified embodiment, step SR1 corresponds to the mode selector means of the controller 50 for selecting one of the two modes. Further, step SR2 of FIG. 10, step SS2 of FIG. 3, and step S10 of FIG. 2 correspond to the first control means, while step SR3 of FIG. 10, step SS 2 of FIG. 3, and step S10 of FIG. 2 correspond to the second control means.

It is to be understood that the present invention is not limited to the precise details of the presently preferred embodiments which have been illustrated and described by way of examples only, and that various changes, modifications and improvements may be made in the invention, without departing from the spirit and scope of the invention defined in the following claims.

What is claimed is:

1. A control apparatus for a power transmitting system for an automotive vehicle, including a continuously variable transmission whose speed ratio is continuously variable, wherein power is transmitted from an engine of the vehicle to drive wheels of the vehicle, comprising:

first detector means for detecting a currently required output of said engine;

second detector means for detecting a running speed of the vehicle;

mode selector means responsive to said first detector means, for selecting one of a continuously variable speed mode in which said speed ratio of the continuously variable transmission is continuously changed, and a stepping shift mode in which said speed ratio is changed in a plurality of steps, said continuously variable transmission having a plurality of speed-ratio positions which correspond to said plurality of steps, said mode selector means selecting said continuously variable speed mode while the currently required output of the engine detected by said first detector means is equal to or smaller than a predetermined reference value, and selecting said stepping shift mode when said currently required output of the engine exceeds said predetermined reference value during an increase in the detected required output of the engine;

first control means operable when said continuously variable speed mode is selected, for continuously changing said speed ratio of said continuously variable transmission so as to operate said engine according to an optimum fuel consumption curve; and second control means operable when said stepping shift mode is selected, for selecting one of said plurality of speed-ratio positions, maintaining the selected speed-ratio position, and selecting another of said speed-ratio positions for reducing the speed ratio of said transmission so as to permit a speed of said engine t be lowered, based on the detected currently required output of the engine and the running speed of the vehicle detected by said second detector means.

2. A control apparatus according to claim 1, wherein said engine has a throttle valve, and said first detector means comprises a throttle sensor for detecting a current opening angle of said throttle valve, said selector means selecting said continuously variable speed mode when the detected opening angle of said throttle valve is equal to or smaller than a predetermined reference value, and selecting said stepping shift mode when said detected opening angle is larger than said reference value.

3. A control apparatus according to claim 1, wherein said vehicle has an accelerator pedal, and said first detector means senses an amount of operation of said accelerator pedal to detect said currently required output of said engine, said selector means selecting said continuously variable speed mode when the detected amount of operation of said accelerator is equal to or smaller than a predetermined reference value, and selecting said stepping shift mode when said detected amount of operation is larger than said reference value.

4. A control apparatus according to claim 1, further comprising third detector means for detecting an actual speed of an input shaft of said continuously variable transmission, and memory means for storing a first relationship among a target speed of said input shaft, said detected currently required output of said engine and said detected running speed of the vehicle, said first control means being operable in said continuously variable speed mode, to determine said target speed of said input shaft according to said first relationship, based on said detected currently required output of the engine and said detected running speed of the vehicle, and control said continuously variable transmission such that said speed ratio is continuously changed so that the detected actual speed of said input shaft coincides with the determined target speed.

5. A control apparatus according to claim 1, further comprising third detector means for detecting an actual speed ratio of said continuously variable transmission, and memory means for storing a first relationship among a target speed ratio of said transmission, said detected currently required output of said engine and said detected running speed of the vehicle, said first control means being operable in said continuously variable speed mode, to determine said target speed ratio of said transmission according to said first relationship, based on said detected currently required output of the engine and said detected running speed of the vehicle, and control said continuously variable transmission such that said speed ratio is continuously changed so that the detected actual speed ratio of said input shaft coincides with the determined target speed ratio.

6. A control apparatus according to claim 1, further comprising third detector means for detecting an actual speed of an input shaft of said continuously variable transmission, and memory means for storing a second relationship among a target speed of said input shaft, said detected currently required output of said engine and said detected running speed of the vehicle, said second control means being operable in said stepping shift mode, to determine said target speed of said input shaft according to said second relationship, based on said detected currently required output of the engine and said detected running speed of the vehicle, in order to permit said continuously variable transmission to maintain said selected speed-ratio position, said second means controlling said continuously variable transmission such that said speed ratio is changed in said plurality of steps so that said actual speed of said input shaft coincides with the determined target speed.

7. A control apparatus according to claim 1, further comprising third detector means for detecting an actual speed ratio of said continuously variable transmission, and memory means for storing a second relationship among a target speed ratio of said transmission, said detected currently required output of said engine and said detected running speed of the vehicle, said second control means being operable in said stepping shift mode, to determine said target speed ratio of said transmission according to said second relationship, based on said detected currently required output of the engine and said detected running speed of the vehicle, in order to permit said continuously variable transmission to maintain said selected speed-ratio position, said second means controlling said continuously variable transmission such that said speed ratio is changed in said plurality of steps so that said actual speed ratio of said input shaft coincides with the determined target speed ratio.

* * * * *